United States Patent [19]
Sagoci

[11] 3,831,136
[45] Aug. 20, 1974

[54] METHOD OF INITIATING AND COLLECTING SEISMIC DATA RELATED TO STRATA UNDERLYING BODIES OF WATER USING A CONTINUOUSLY MOVING SEISMIC EXPLORATION SYSTEM LOCATED ON A SINGLE BOAT

[75] Inventor: Hilmi F. Sagoci, Houston, Tex.

[73] Assignee: Chevron Research Company, San Francisco, Calif.

[22] Filed: June 6, 1973

[21] Appl. No.: 366,382

Related U.S. Application Data

[63] Continuation of Ser. No. 250,503, May 5, 1972, abandoned.

[52] U.S. Cl. .......................... 340/7 R, 340/15.5 MC
[51] Int. Cl. .......................... G01v 1/38, G01v 1/28
[58] Field of Search ........... 340/7 R, 7 PC, 15.5 MC

[56] References Cited
UNITED STATES PATENTS

| | | | |
|---|---|---|---|
| 3,525,072 | 8/1970 | Born et al. | 340/7 PC |
| 3,581,273 | 5/1971 | Hedberg | 340/7 PC |

*Primary Examiner*—Richard A. Farley
*Assistant Examiner*—N. Moskowitz
*Attorney, Agent, or Firm*—Ralph L. Freeland, Jr.; H. D. Messner

[57] ABSTRACT

Description is hereinafter had to a method for collecting seismic data related to two-dimensional subsurface coverage of strata underlying a body of water. In accordance with the present invention, a continuously moving marine seismic exploration system includes a repetitive seismic source and a streamer of hydrophones trailing behind a single seismic boat traversing the body of water along a straight base course line. The seismic source is fired at a selected repetition rate to generate a series of firing stations coincident with the base course line. The streamer includes a plurality of hydrophones connected to the seismic boat by means of a lead-in cable extending from the rear of the boat and also includes a paravane assembly connected to the trailing end of the seismic streamer. The paravane has a rudder assembly whose position can be preset or be varied, as by radio commands from the seismic boat or under mechanically induced programmed commands, to change direction whereby the trailing end of the streamer is drawn through the water along a straight line parallel to the base line and offset from it by a selected distance. The terminus of the lead-in cable and the position of the remainder of the streamer (including all hydrophones) maintain a fixed geometry with respect to the base course line of the seismic boat. When the seismic source is activated at a selected repetition rate, a swathe of seismic data thus can be generated related to positional locations in a form of a swathe of two-dimensional center point grid arrays having an outer boundary parallel to the base course line at a distance equal to ½ the offset distance of the trailing end of the streamer from this same base course line. Since the seismic boat proceeds along the base course line at a constant speed, a uniform density of in-line seismic depth points is obtained. The density of cross-depth points depends on the distribution of hydrophones along the streamer. For equi-spaced hydrophones the density of cross-depth points decreases away from the base course line. In a preferred implementation of the method the hydrophones would be spaced along the streamer in such a way as to yield a uniform density of seismic cross-depth points. In order for the swathe of source-receiver positions at the surface to be clearly identified with the series of center point arrays, the streamer is provided with a series of sonic transducers along its length. Sonic pulses are emitted from a transmitter aboard the boat (preferably after the seismic source is activated, but before the reflections are received at the hydrophones) and are subsequently detected by the streamer transducers and retransferred back to the boat. In that way, identifying the instantaneous locations of the transducers by means of digital ranging techniques can be achieved. In one form of the invention, the binary indications of the travel time of the sonic wave, and hence the instantaneous positions of the transducers per each shot, are directly encoded onto the field magnetic tape for later use in mapping of the subsurface under survey.

19 Claims, 8 Drawing Figures

METHOD OF INITIATING AND COLLECTING SEISMIC DATA RELATED TO STRATA UNDERLYING BODIES OF WATER USING A CONTINUOUSLY MOVING SEISMIC EXPLORATION SYSTEM LOCATED ON A SINGLE BOAT

This is a continuation of application Ser. No. 250,503, filed May 5, 1972, now abandoned.

FIELD OF THE INVENTION

This invention relates to marine seismic exploration and more particularly to a method of collecting, processing and displaying areal marine seismic data using a continuously moving marine exploration system aboard a single seismic boat. In one aspect of the present invention, seismic data is associated with a two-dimensional array of center points provided by keeping the trailing end of the marine streamer along a straight course line parallel but offset to the base course line while keeping the lead-in cable, attached between the streamer and boat, in a vertical plane through the base course line of the boat. In another aspect, the relative positions of hydrophones of the streamer relative to the boat during each shooting and collection period are accurately established using a digital sonic ranging technique in which sonic pulses from a transmitter aboard the boat are detected by a series of transducers along the streamer and retransmitted back to the boat for recording onto a magnetic tape in a digital format compatible with a special purpose or a programmed general purpose digital computer.

BACKGROUND OF THE INVENTION

In the art of seismic exploration, the desirability of increasing signal-to-noise ratio of marine seismic data is well known. A successful technique of producing a series of locational seismic traces associated with cross sets of center points of constant density is described in a copending application of Aubra E. Tilley, R. J. S. Brown and Roger D. Judson for "Method of Collecting Seismic Data of Strata Underlying Bodies of Water," Ser. No. 881,051, filed Dec. 1, 1969. In the aforementioned application, locational traces related to a constant density grid of two-dimensional center points are obtained utilizing a plurality of shooting boats in which seismic sources aboard a first and second shooting boats are sequentially fired as the boats traverse flanking zigzag course lines relative to a streamer containing a series of hydrophones. After the locational traces are generated, these traces can be associated with cross sets of center points substantially normal to the base course line of the streamer and processed by a technique known as beam steering to produce a series of cross directional traces. Each cross directional trace has an enhanced (increased) signal-to-noise ratio. Although sonar and radar techniques are known which could synchronize operations of the shooting and recording boats, most service companies do not have such equipment due to the limited call for three-dimensional subsurface collection efforts. Accordingly, there has been some difficulty in getting the technique into field usage.

Another difficulty of a more generic nature relates to the requirement of digital recording of seismic data in the field. Digital field recording of data is of recent origin due to the availability of general and special purpose digital computers for processing seismic data. In this type of recording, the analog seismic signals detected by the hydrophones are first multiplexed by appropriate circuitry, say, located aboard a recording boat and then converted to a digital format compatible with computer processing. Normally, in digital field recording, 12 binary bits are needed to define a number representing the amplitude of the analog seismic signal at a given point along the time base. These binary bits of information are then recorded on the data record section of the seismic magnetic tape in a time sequence related to the sampling rate. The resulting digital field tapes are then transmitted to a digital computing center for processing.

Among the mathematical and statistical processing techniques normally used at a computer center (in addition to the beam-steering process noted above) is a process known as "common $d$epth $p$oint $s$tacking" (CDPS). In CDPS, associative seismic signals in digital form (i.e., binary bits associated with semicommon subsurface reflection areas) are combined so as to enhance primary seismic events in the records while attenuating noise and secondary (multiple) events. The associative character of the processing requires that the data be collected in the field in a manner that provides subsurface coverage of the same area many times, as obtained using the so-called "rollalong" field collection technique.

(In the rollalong technique, a first record is made with the seismic source and hydrophone spread positioned at a first series of locations; then a second record is made with the source advanced a certain in-line distance relative to the hydrophone spread. The hydrophone spread is advanced a similar in-line distance relative to a line of survey. By moving the source and hydrophone spread the same in-line distance, say, the equivalent of twice the spacing between hydrophone stations, the resulting seismic information in digital form provides multiple coverage of the same subsurface area along the line of survey.)

It is evident, whether or not two- or three-dimensional mapping is contemplated, that positional annotation between hydrophone stations and seismic source points must occur as the data is recorded. If the aforementioned annotation does not occur, later processing of such data using CDPS can provide erroneous results since the algebraically summed results related to "common" depth points are themselves in error. Data annotated as related to a particular geographic area may actually relate to another area displaced to a substantial distance from the former. Further, such positional errors can be retained in later produced records irrespective of the final display format of the data.

OBJECTS OF THE INVENTION

An object of the present invention is the provision of a continuously moving marine seismic exploration system utilizing a single marine boat for operation and collection of seismic data in the form of locational traces associated with a swathe of uniform two-dimensional grid arrays of center points along the base course line of the boat.

Another object of the present invention is the provision of a method and apparatus for encoding, on the header section of the seismic magnetic tape, a binary identification code which relates ultimately to the identification of relative and absolute hydrophone station and source point locations associated with a given shot as by using digitized seismic signals detected by a series of transducers aboard the marine streamer. The signals are then processed into the correct digital format for encoding onto tape.

SUMMARY OF THE INVENTION

The present invention proposes a method for collecting seismic data related to two-dimensional subsurface coverage of strata underlying a body of water using a single marine seismic boat. In accordance with the present invention, a continuously moving marine seismic exploration system includes a repetitive seismic source and a streamer of hydrophones trailing behind a single seismic boat traversing the body of water along a straight base course line. The seismic source is fired at a selected repetition rate to generate a series of firing stations coincident with the base course line. The streamer includes a plurality of hydrophones connected to the seismic boat by means of a lead-in cable extending from the rear of the boat and also includes a paravane assembly connected to the trailing end of the seismic streamer. The paravane has a rudder assembly whose position can be preset or adjusted, as by radio commands from the seismic boat or under mechanically induced programmed commands, so that the trailing end of the streamer is drawn through the water along a straight line parallel to the base course line and a constant offset distance from it. Both the terminus of the lead-in cable and the remainder of the streamer (including all hydrophones) maintain the same geometry with respect to the base course line of the seismic boat. When the seismic source is activated at a selected repetition rate, a swathe of seismic data thus can be generated related to positional locations in the form of a swathe of two-dimensional center point grid arrays (per half cycle of each survey operation) having an outer boundary parallel to the base course line and at a perpendicular distance from it equal to ½ the offset distance provided by the trailing end of the streamer. Since the seismic boat proceeds along the base course line at a constant speed, there results a uniform density of in-line seismic depth points. The density of cross-depth points depends on the distribution of hydrophones along the streamer. For equi-spaced hydrophones, the density of cross-depth points decreases away from the base course line. In a preferred implementation of the method the hydrophones are spaced in a manner to yield a uniform density of cross-depth points. In order for the swathe of data to be clearly identified with the series of center point arrays, the streamer is provided with a series of sonic transducers along its length. Sonic pulses are emitted from a transmitter aboard the boat (preferably after the seismic source is activated but before the reflections are received at the hydrophones) and are subsequently detected by the streamer transducers and retransferred back to the boat. In that way, identifying the instantaneous locations of the transducers by means of digital ranging techniques can be achieved. In one form of the invention, the binary indications of the travel time of the sonic wave, and hence the instantaneous positions of the transducers per each shot, are directly encoded onto the field magnetic tape for later use in mapping of the subsurface under survey.

Other advantages and objects of the present invention will become more apparent from the following detailed description taken in conjunction with the following accompanying drawings in which:

PREFERRED EMBODIMENTS

Figure 1:
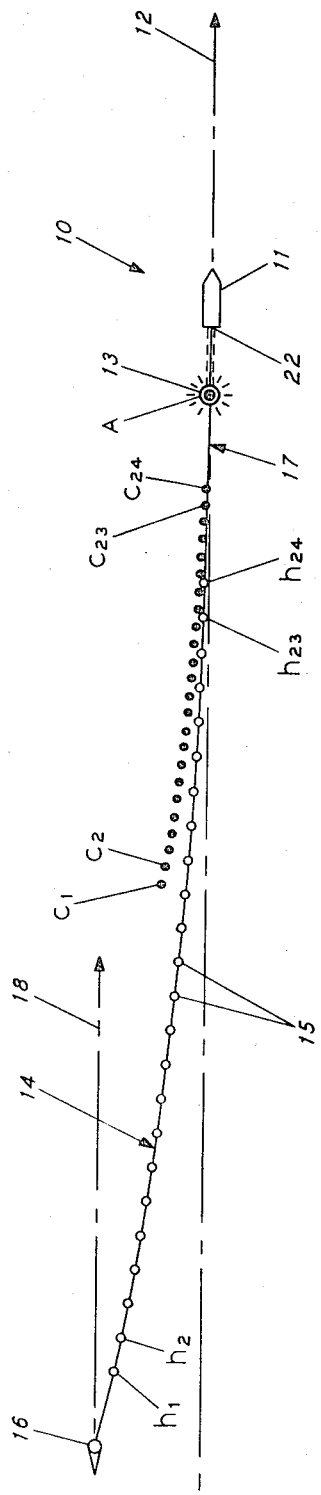
FIGS. 1 and 2 illustrate, in plan view, a chronologically related sequence of two instantaneous positions of a marine streamer and repetitive seismic source operated from and in conjunction with circuitry aboard a single seismic boat; these Figures illustrating that a series of locational traces can be associated with individual center points aligned along a series of projections as the trailing end of the marine streamer maintains its perpendicular offset distance from the base course line.

Referring now to FIG. 1, a marine seismic exploration system 10 is shown at one point in time as single shooting and recording boat 11 traverses along a straight, base course line of traverse 12. Behind shooting and recording boat 11 are seismic source 13 and marine streamer 14 including a series of hydrophones (functionally indicated at 15 and terminating in paravane assembly 16. At its leading end, the marine streamer 14 is coupled to the boat 11 by means of lead-in cable 17.

During the collection process, the shooting and recording boat 11 and seismic source 13 travel a straight line, along course line 12. However, the travel of the marine streamer 14 is more complex. Paravane assembly 16 is provided with a rudder assembly (not shown) which can be programmed to maintain the position of the trailing end of the streamer along a pathway 18 parallel to but a fixed distance D from the course line 12. Terminus 22 of lead-in cable 17, however, remains in a vertical plane coincident with course line 12. Accordingly, the more centrally located individual hydrophones 15 follow a family of parallel paths having different (and progressively smaller) offset distances with respect to the line 12.

Location of the source 13 as activation occurs is at point A in FIG. 1. In FIG. 1, the paravane assembly 16 is at its initial position relative to the course line 12. Accordingly, when source 13 is activated, a series of center points designated $C_1 - C_{24}$ located at the midpoint between source point A and hydrophones 15 of the streamer 14 are generated which form the first set of cross offset points of the grid array. As shown, each of the center points $C_1, C_2,...C_{24}$ is midway along an imaginary family of lines drawn between source point A and the instantaneous positions of respective hydrophone stations of the streamer 14. The curvature of the center points is seen to be parallel with that of the streamer, say in the form of a two- or three-dimensional catenary. The cross offset of the hydrophone positions forming respective hydrophone stations $h_1...h_{24}$ is not constant, i.e., the distance from the course line 12 to station $h_1$ is larger than that from the line 12 to the station $h_{24}$. Accordingly, the cross offset of the center points $C_1 - C_{24}$ from line 12 is also variable.

Figure 2:
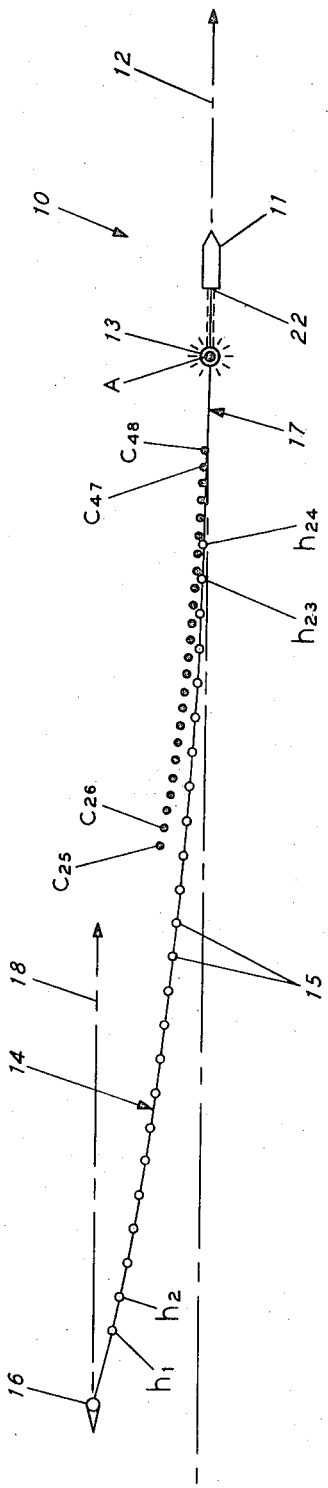

In FIG. 2, marine exploration system 10 is shown at another point in time along base line 12. As shown, the paravane assembly 16 has moved from its initial position (FIG. 1) to a more forward location, while maintaining its distance D with respect to line 12. As the seismic source 13 is activated, the instantaneous position of the seismic source generates a new source point. At this instant, the instantaneous positions of the individual hydrophones generate a new array of center points $C_{25} - C_{48}$ as shown.

Figure 3:
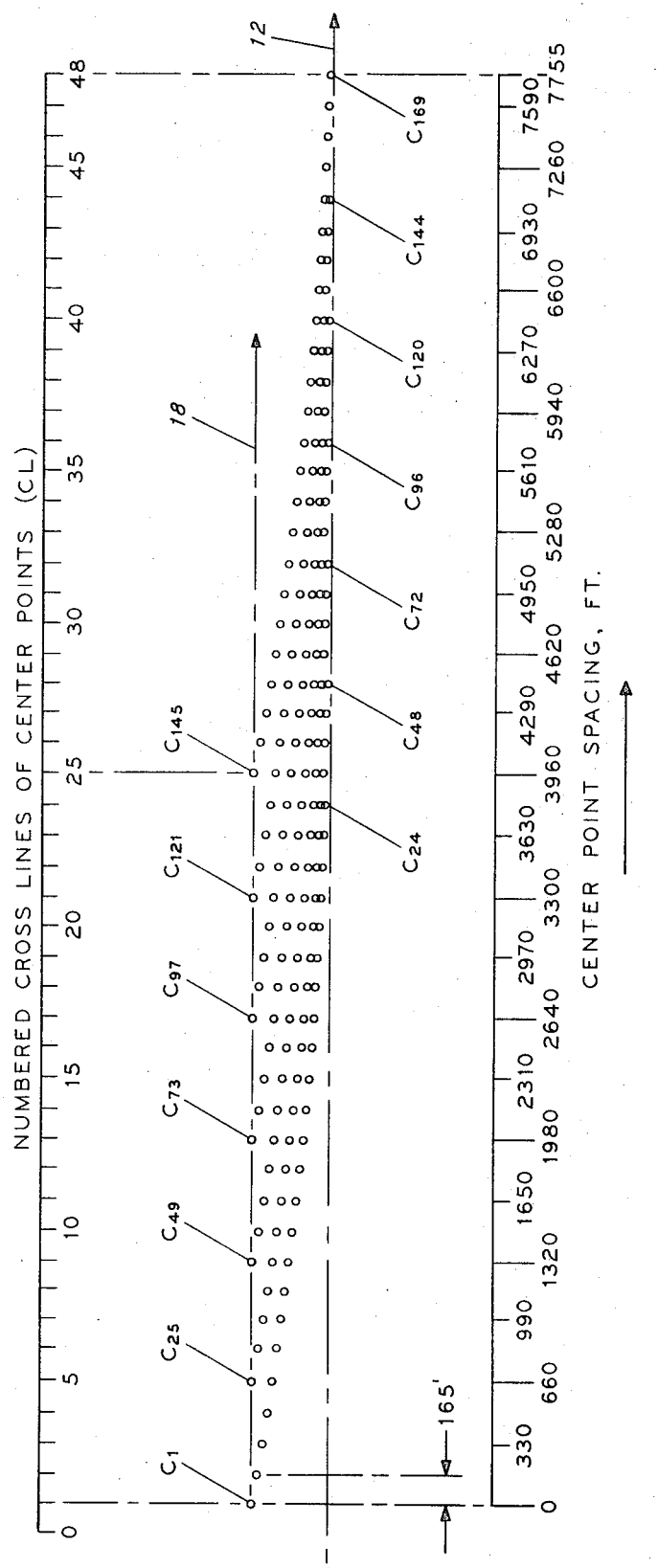
FIG. 3 is a plot of a two-dimensional, grid of center points related to the instantaneous positions of the hydrophone and source array of FIGS. 1 and 2 and subsequent positions.

FIG. 3 illustrates the two-dimensional grids of center points generated during a sequence of surveying operations comprising 7 shots. Typical spacing of the center points is indicated in feet across the bottom of the Figures. The offset spacing angle between the paravane assembly and the course line 12 is about 13°.

It should be noted that the variation of instantaneous positions as the data is collected generates center point grids whose boundary parallels line 12. Although the center points of the grid are aligned along imaginary lines perpendicular to base course line 12, the density of points decreases away from this line.

It is important to know the position of each center point of the grid. Accordingly, the relative instantaneous positions of the hydrophones of the streamer relative to the seismic source must be accurately established during each period of shooting and collection of data cycle. That is, the relative position of the hydrophone stations $h_1 - h_{24}$ of FIG. 1 relative to source point A must be determined and indicated, as the seismic data is collected.

Figure 4:
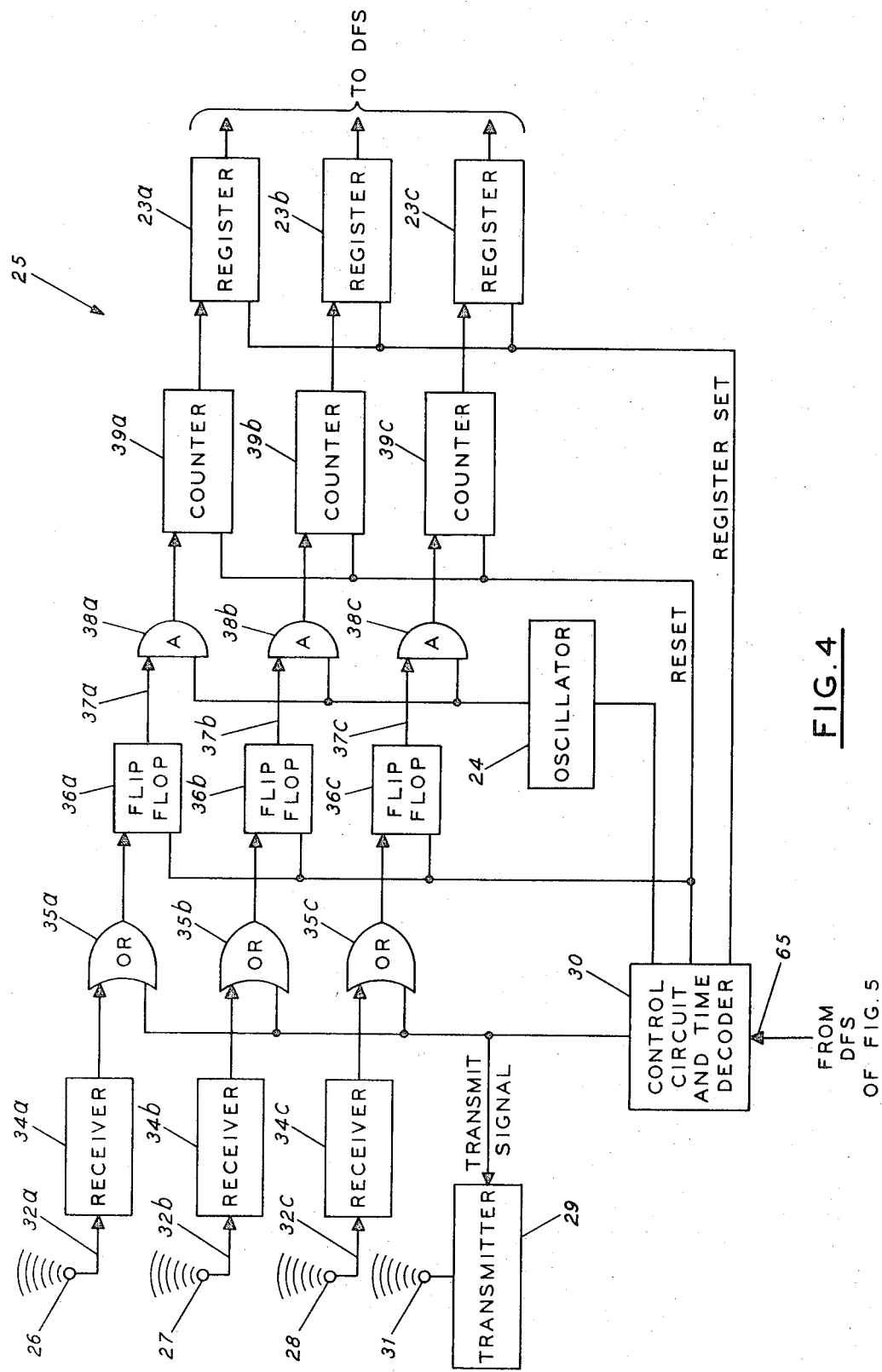
FIG. 4 is a schematic representation, in block form, of circuitry for generating digitized locational information related to the relative positions of the marine streamer during each shooting and collection period.

FIG. 4 is a system block diagram of digital sonar range indicating circuitry 25 for indication of relative positions of three target transducers 26, 27 and 28 positioned along the marine streamer during each shooting and collection period. Before describing circuitry 25 in detail, however, a brief discussion of digital field equipment useful in recording of field data in a digital format may be instructive, and will now be presented with specific reference to FIG. 5.

Figure 5:
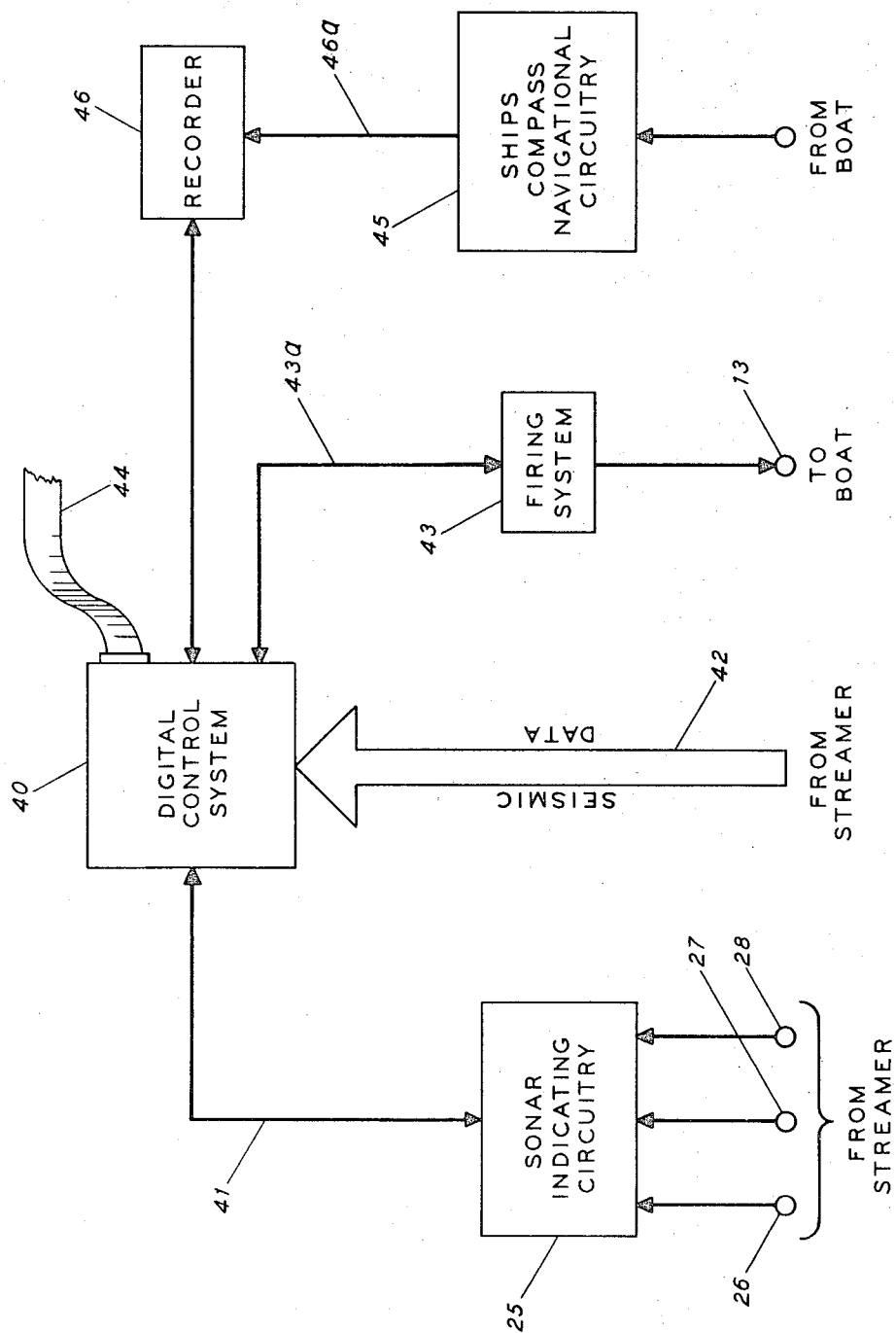
FIG. 5 is a diagrammatic representation of a digital sonic detecting and recording circuitry for collecting, recording and coding of seismic data including locational information related to the relative position of the marine streamer during each shooting and collection period in binary form, using the collection method of FIGS. 1, 2 and 3.

As shown in FIG. 5 the heart of the digital field collection systems of the present invention is digital field control system 40 which coordinates operations of all remaining circuitry. As shown, the remaining field circuitry includes: sonar range circuitry 25 interconnecting target transducers 26, 27 and 28 with the digital field control system 40 through conductor means 41. Paralleling conductor means 41 and sonar range circuitry 25 is field conductor means 42 connecting the hydrophones of the streamer to the digital field control system 40. In order to synchronize data collection operations, the digital field control system 40 is also seen to connect via conducting means 43a through firing system 43 to a seismic source 13. All system information is recorded on a field magnetic tape 44 within system 40.

Although relative mapping of the streamer is established by sonar range indicating circuitry 25 (to be explained in detail below), there is also a need for determining the absolute geographic positions of the streamer. For this purpose, navigational circuitry 45 is seen in FIG. 5 to connect through conducting means 46a to a separate digital recording means 46.

Timing logic for controlling the operation of the circuitry of FIG. 5 can be quite complex and a key to understanding the interrelated operations is by observing the digital format of the information recorded onto magnetic tape 44.

Primary requisite of the format of tape 44: it must be, of course compatible with later processing by digital computer. Further, since the computer basically manipulates and processes data based on data character length divided into "words" and "blocks," the magnetic tape format of tape 44 must be likewise organized.

Figure 6:
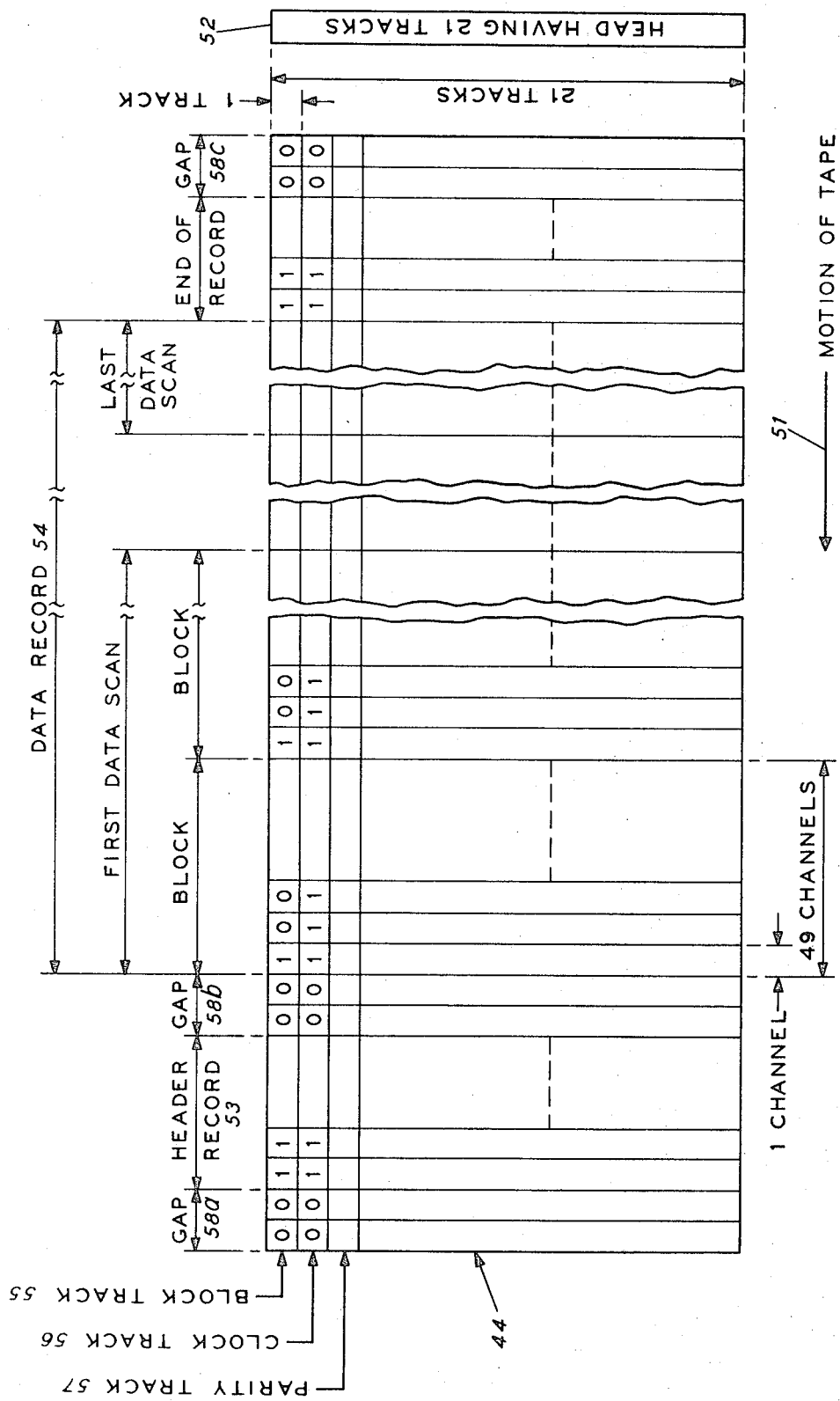
FIGS. 6 and 7 illustrate bit-word representation of the locational information onto magnetic tape in binary format as provided by the circuitry of FIG. 4

In FIG. 6, for example, a conventional magnetic tape format is seen to be arranged in a series of 21 tracks across the width of the tape 44 and in a plurality of channels along the length of the tape 44. Motion of the tape is in the direction of arrow 51. Transfer of data to the tape is accomplished by a 21-track head unit 52 positioned at the right-hand side of FIG. 6. Indications of specific sections of data along the longitudinal length of the tape divide each record into a header section 53, and a data record section 54. Within the data record section 54, the data is further organized into a series of data section as indicated.

Along the width, the series of tracks include the following: 18 data tracks and 3 control tracks. The control tracks comprise block track 55, clock track 56 and parity track 57. Further, one of the data tracks, say, the 0 track, can be utilized, sequentially, for control purposes, viz, to indicate the sign (±) of the channel.

The block and clock tracks 55 and 56 are used to record block pulses and clock pulses, respectively. A block pulse is generated at the dividing point between each two data blocks and thus distinguishes the data blocks which follow. The block pulses are recorded by continuously magnetizing the block track 55 in one direction by means of the head unit 52. To establish the ONE state, the block track 55 is magnetized continuously at the start of the record, the end of the record, and for each block address word. Where data words are inserted into the record after the block address, no pulses are recorded within the block track 55 (ZERO state).

A clock pulse is generated at clock track 56 at each channel for all data words. Where a gap appears in the record, say, at gaps 58a, 58b, 58c, the data bits on block track 55 and clock track 56 are in the ZERO state. At the start of each block of data, except for the zero block address (remaining channel tracks are in the ZERO state), the address is signified by means of $2^0$ to $2^N$ orders of binary bits which can appear in the 18 data channels.

The parity track 57 is used to record a parity pulse which serves as a check of the efficiency of the transfer of the seismic data to the magnetic tape. All information within one data channel should add up to either an odd or even number which can be checked with the parity signal provided within each parity track 57. For example, for the data tracks 1, 2...18, a parity pulse ONE will appear if these data tracks contain an even number of ONE's.

Gaps 58a, 58b and 58c have previously been indicated by means of ZERO states at the block and clock tracks 55 and 56 for all channels comprising the gap. Gap 58b is seen to be positioned between header record section 53 and data record section 54. After data has been transferred the header record section, head unit 52 can be positioned at gap 58b to await reception of seismic signals at the hydrophones. When the tape is motionless, the head 52 preferably rests over the middle of the gap. ½ of the length of the gap is usually required to accelerate the tape motion up to full recording speed.

Within the data record section 54, each channel is divided into one 18-bit word and 3 control bits, as previously mentioned. The number of blocks required to provide a seismic data record varies with the amount of fixed information which is provided to the head unit 52. For example, a 6-second analog signal received at the hydrophone spread of FIG. 1 and sampled at 0.002-second intervals, digitized and then recorded, will have 6/0.002 = 3,000 blocks of data arranged along the longitudinal length of the magnetic tape.

Within each data scan, the first channel of each block is referred to as the block word. The block word, as previously mentioned, specifies the number of the block and identifies the channel as a block word in the form previously mentioned. The remaining number of channels in each block are referred to as data words and, in length, can vary in accordance with the number of hydrophones within the hydrophone spread. The seismic data is located within each data channel in, say, the most significant 13-bit positions of each 18-bit word. The remaining bits of each data channel provide for recording of binary amplifier gain change indications (4 bits) as well as the sign indication (1 bit).

As will be explained in more detail below, binary gain amplifiers are used to amplify the signal provided each hydrophone. The intensity of these signals received at the streamer spread and amplified by the binary gain amplifiers varies over an extremely large dynamic range. To avoid overloading the binary gain amplifier, the gain must be varied in accordance with the amplitude of the received signal. The incremental gain of each amplifier is indicated by the binary amplifier gain change indications (4 bits) mentioned above.

Figure 7:
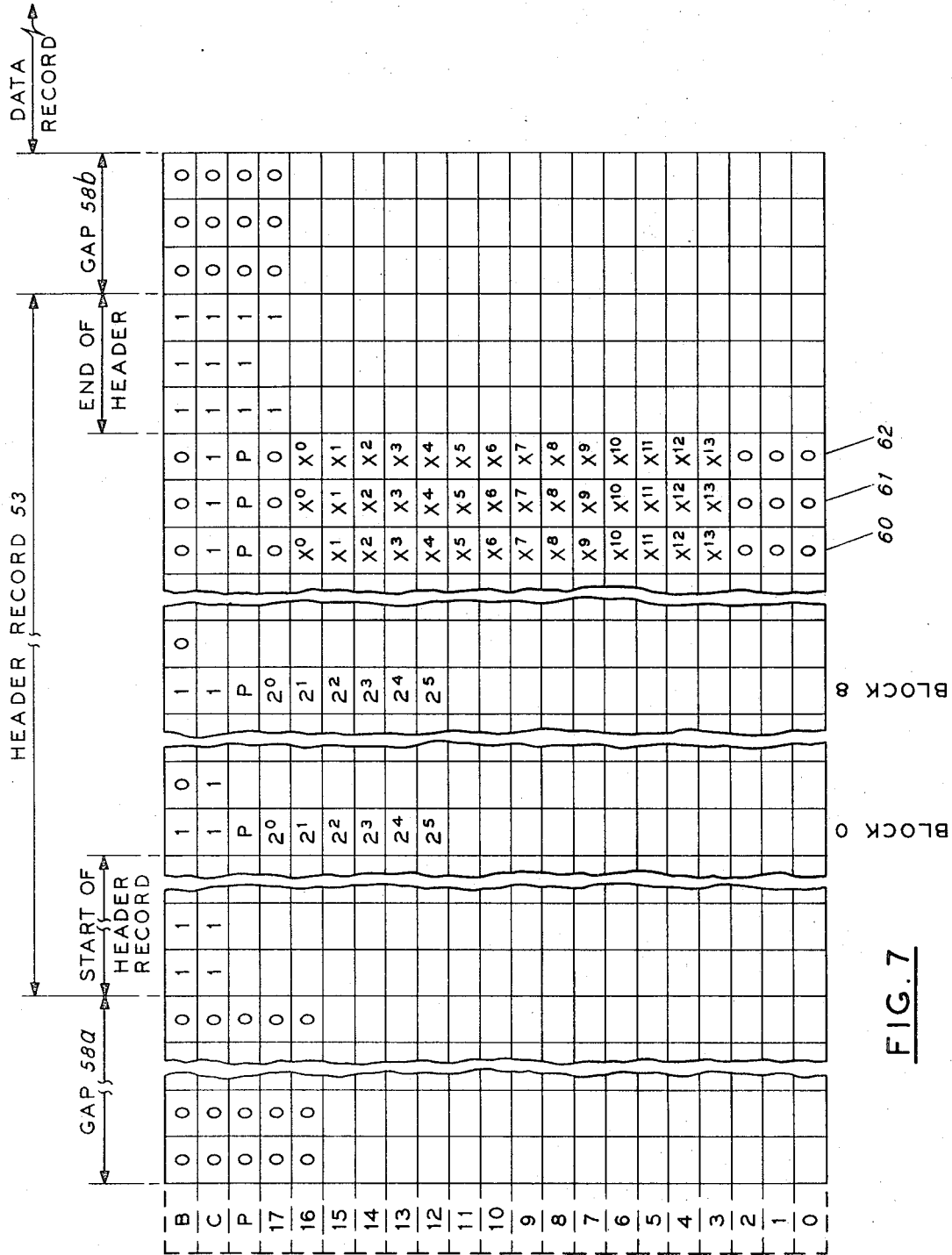

FIG. 7 depicts the header section 53 in more detail. Along the left-hand side, as viewed in FIG. 7, tracks 0 to 17 are illustrated related to the 18 data channels (with four blanks) while the control channels b, c and p relate to the block track, the clock track and the parity track, respectively. At the start of the header record, block track and clock track b and c are coded with a "ONE" stored as shown. Within the remaining data tracks, the sign number, reel number, geographic location can be inserted in alphanumeric form. Beginning at block address "0," various conventional instrument settings are applied to the tape, such as the amount of presuppression set into each binary gain amplifier (initial gain) as well as the constant gain factor of each amplifier. Since modern seismic collection techniques employ a great number of individual binary amplifiers, the binary data identifying amplifier characteristics as well as filter characteristics can occupy a rather large block of data, say, from block "0" to block "8" of the header section 53. Following the eight blocks of amplifier information, in binary form, there are set aside several blocks of data to indicate the following data in binary form: serial number, instrument type, sampling rate, hydrophone spacing interval, record length, trip delay as well as a series of hydrophone position marking codes. At selected channels, say, identified with words 60, 61, 62, of block 10 of the header record section 53, a three-word, 14-bit digital code (four blanks) identification is set forth. As explained below, each word 60, 61 or 62 identifies -- in binary form -- the time of sonic wave travel to transducers 26, 27 and 28 of FIG. 5 with respect to an origin point on the boat just prior to reception of the seismic energy. Each multibit digital code can be transposed as represented by a decimal number related to range. For example, bit characters of each code $X^0...X^{13}$ positioned or tracks 16...3 can represent several orders of ranging information. Whether or not all bit characters are utilized depends on the travel time required for encoding onto the magnetic tape. In marine practice, it is not unusual to have ultralong marine streamers. The travel time of the sonic wave can be represented by the quantity R/V where R is the slant range to a certain streamer transducer, and V is the velocity of sonic transmission equal to 5,000 feet/sec. Accordingly, assuming a maximum slant range of 3 miles (15,840'), the maximum time of travel (to a trailing end of the streamer) would be about 3.17 secs. If the counting rate is, say, 5,000 counts/sec., then 15,840 counts would be generated during each ranging cycle. In a digital code utilizing at least 14-bit positions ($X^0...X^{13}$), a time duration function of up to 16,382 counts can be designated per each 18-bit digital word (with three blank bits). (If greater range is to be indicated or a higher counting rate utilized the three blank bits of each 18-bit word can be used as a gain function equal to a multiplier function of 2, 4 or 8. Otherwise, these three bits are blank.) The remaining bit is utilized to indicate whether or not the transducers are to the right or left flank of the seismic boat as viewed in FIG. 1 -- a ONE, say, for the left, and a ZERO for the right.

The invention is not limited to a 21-track format, however. A 9-track format could also be used without departing from the intended scope of the present invention. In a 9-track format, 8 data tracks are utilized, number 0, 1, 2, 3, 4, 5, 6 and 7, and one parity track (p) is also utilized. Each value is contained, in each record channel, in one group of 8-bit characters called a byte. Accordingly, in a 9-track format, each range code, containing at least 14-bit characters, would require to be recorded as at least two separate bytes of information.

As an example of the output of the binary code related to travel time, consider the binary codes for a range of 16,381 feet (for a transducer positioned, say, at the trailing end of the marine streamer); a midpositioned transducer (at, say, 9,855 feet from the marine boat); and a leading edge transducer located at about 330 feet from the marine boat. The binary code provided at the bit characters on three adjacent channels of a 21-track tape would be as follows assuming a counting rate of 5,000 counts/sec. and a travel velocity of 5,000 ft./sec.:

| | $X^0$ | $X^1$ | $X^2$ | $X^3$ | $X^4$ | $X^5$ | $X^6$ | $X^7$ | $X^8$ | $X^9$ | $X^{10}$ | $X^{11}$ | $X^{12}$ | $X^{13}$ |
|---|---|---|---|---|---|---|---|---|---|---|---|---|---|---|
| Binary | 0 | 1 | 1 | 1 | 1 | 1 | 1 | 1 | 1 | 1 | 1 | 1 | 1 | 1 |
| Decimal | | | | | | | 16,381 (counts) | | | | | | | |
| Binary | 0 | 0 | 0 | 1 | 1 | 0 | 0 | 1 | 0 | 1 | 0 | 0 | 0 | 1 |
| Decimal | | | | | | | 9,855 (counts) | | | | | | | |
| Binary | 0 | 1 | 0 | 1 | 0 | 0 | 1 | 0 | 1 | 0 | 0 | 0 | 0 | 0 |
| Decimal | | | | | | | 330 (counts) | | | | | | | |

The most significant bit of the code is, of course, the $X^0$ bit.

Since the streamer is assumed to be at a constant depth, the travel time indication to each transducer aboard the streamer establishes the relative locations of the hydrophones in the following manner: at the computer center, the travel time binary code is converted into slant range indications for each collection period. Since the streamer is at a common depth and all hydrophone positions relative to the transducer positions are known, the relative locations of all hydrophones can be thus established.

Similar techniques at the center can be used to establish the geodetic positions of the streamer transducers and then the hydrophones. Since the hydrophone geodetic positions are derived from the geodetic positions of the transducer, only the coordinate generation of the former will be described in detail.

At the computer center, the binary multiword range indications with respect to the seismic boat, as provided by navigation circuitry 45 of FIG. 5, are utilized to transform the coordinates established for the boat to indicate hydrophone position.

As to the transformation process, reference is made hereinafter to the following example.

Given: Slant ranges $R_1$, $R_2$ and $R_3$;
Depth of the streamer D and $X_a$, $Y_a$, $Z_a$
where $X_a$, $Y_a$, $Z_a$ are the three-dimensional coordinates of the transmitting transducer of the digital sonar ranging circuitry 25 of FIG. 5 during a selected collection period.

Calculate: The individual target coordinates $X_1$, $Y_1$, $Z_1$; $X_2$, $Y_2$, $Z_2$; $X_3$, $Y_3$, $Z_3$ of the transducers of the marine streamer to be computed using the following equations:

$$\text{Slant } R_1 = \sqrt{(X_1 - X_a)^2 + (Y_1 - Y_a)^2 + (Z_1 - Z_a)^2}$$
$$\text{Slant } R_2 = \sqrt{(X_2 - X_a)^2 + (Y_2 - Y_a)_2 + (Z_2 - Z_a)^2}$$
$$\text{Slant } R_3 = \sqrt{(X_3 - X_a)^2 + (Y_3 - Y_a)^2 + (Z_3 - Z_a)^2}$$

Assuming a datum plane at the surface of the body of water, then the three-dimensional coordinates at the datum plane, namely, $X_{d1}$, $Y_{d1}$, $Z_{d1}$; $X_{d2}$, $Y_{d2}$, $Z_{d2}$; and $X_{d3}$, $Y_{d3}$, $Z_{d3}$ for the transducers can be calculated using the following equations:

$$\sqrt{R_1^2 - D^2} = \sqrt{(X_{d1} - X_a)^2 + (Y_{d1} - Y_a)^2 + (Z_{d1} - Z_a)^2}$$

$$\sqrt{R_2^2 - D^2} = \sqrt{(X_{d2} - X_a)^2 + (Y_{d2} - Y_a)^2 + (Z_{d2} - Z_a)^2}$$

$$\sqrt{R_3^2 - D^2} = \sqrt{(X_{d3} - X_a)^2 + (Y_{d3} - Y_a)^2 + (Z_{d3} - Z_a)^2}$$

where $R_1$, $R_2$ and $R_3$ are the slant ranges separating the transmitting and receiving transducers, D is the depth of the streamer and $X_{d1}$, $Y_{d1}$, $Z_{d1}$; $X_{d2}$, $Y_{d2}$, $Z_{d2}$, and $X_{d3}$, $Y_{d3}$, and $Z_{d3}$ are the three-dimensional coordinates of the target transducers transformed to the datum plane.

It should be obvious that distribution (spacing) of the hydrophones could be varied so that the seismic information could be associated with positional locations defining a grid of center points of uniform density, as, for example, described in the aforementioned patent applications assigned to the assignee of the present application.

Referring again to FIG. 4, the digital sonar ranging circuitry 25 for providing the aforementioned binary travel time codes for encoding onto magnetic tape will now be described in detail.

After the seismic disturbance has been initiated, time of travel determinations to streamer transducers 26, 27 and 28 are carried out by the sonar ranging circuitry 25 in the following manner: transmitter 29 is energized by means of control circuit 30 to transmit a pulse of sonic energy to transmitting transducer 31 at, say, the rear of the boat and thence the energy travels through the water until detected by receiving transducers 26, 27 and 28 within the marine streamer. Transducers 26, 27 and 28 are energized in the order of their location with respect to origin transducer 31. Assume that transducer 26 is located at the leading position of the hydrophones of the streamer; that transducer 27 is located at the midposition; and that transducer 28 is located near the trailing end of the streamer. Accordingly, the transducer 26 will be energized first, followed by the midposition transducer 27 and finally the trailing transducer 28 is actuated. These signals are passed by way of conductors 32a, 32b and 32c through the marine streamer to the seismic boat. Since transducer 26 at the leading edge of the streamer receives the pulse first, receiver 34a will be actuated first; receiver 34b will be actuated next, followed by receiver 34c. Return signals detected by the receivers 34a, 34b and 34c pass through OR gates 35a, 35b and 35c to flip-flops (bistable multivibrators) 36a, 36b and 36c. These flip-flops are of the type where successive pulses reverse the flip-flops between stable states of operation corresponding to "on" and "off" period modes of operation. Leads 37a, 37b and 37c of the flip-flops 36a, 36b and 37c constitute the output which will deliver an output signal when the flip-flop is in an "on" condition. Connected to the output leads 36a, 36b and 37c are AND gates 38a, 38b and 38c which are responsive to an enabling signal which is provided by control circuit 30 for passing the signals provided by the flip-flops to counters 39a, 39b and 39c.

In order that the counters' readings be indicative of the travel time of a sonic wave from the transmitting transducers to the streamer transducers, oscillator 24 is operational to provide timing and counting pulses in addition to providing pulses to the counters 39a, 39b and 39c through the AND gates 38a, 38b and 38c as shown.

In the sequence of operations, a reset signal from the signal control circuit 30 is first utilized to set the counters 39a, 39b and 39c to zero as well as to reset flip-flops 36a, 36b and 36c so that a zero output signal to the AND gates 38a, 38b and 38c is provided. At this time, the AND gates are closed, and counters 39a, 39b and 39c do not receive the counting pulses from oscillator 24. However, when a transmitting signal from the signal control circuit 30 triggers transmitter 29, each of the flip-flops 36a, 36b and 36c is triggered through OR gates 35a, 35b and 35c permitting a high enabling signal to AND gates 38a, 38b and 38c. Resulting counting pulses are accumulated by counters 39a, 39b and 39c. After the transmitted sonic signal (from transducer 31) is received by the transducers 26, 27 and 28 aboard the streamer, these signals pass via the conductors 32a, 32b and 32c back to the boat, specifically to receivers 34a, 34b and 34c and thence through OR gates 35a, 35b, 35c to flip-flops 36a, 36b, 36c. As the signals are received at OR gates 35a, 35b, 35c, the respective flip-flop is turned "off." Since the flip-flop is turned off, the associated AND gate is blocked, and the associated counter 39a, 39b, 39c stops counting. Connected to each counter is a register 23a, 23b and 23c which receives the count from each counter upon the occurrence of a register set signal from control circuit 30. Such register holds the count until reset through an enabling signal from control circuit 30. In this regard, control circuit 30 includes a series of input channels generally indicated at 65 connected to the digital field control system 40 of FIG. 5. Logic signals pass from the control system 40 through input channels 65 in a predetermined enabling sequence so that binary indications of travel time can be transferred from the registers 23a, 23 b, 23c in proper sequence. Logic circuitry for generating enabling signals to provide for such logic transfers as well as for digital recording of all binary information is depicted with reference to FIG. 8, and will now be described in detail.

Figure 8:
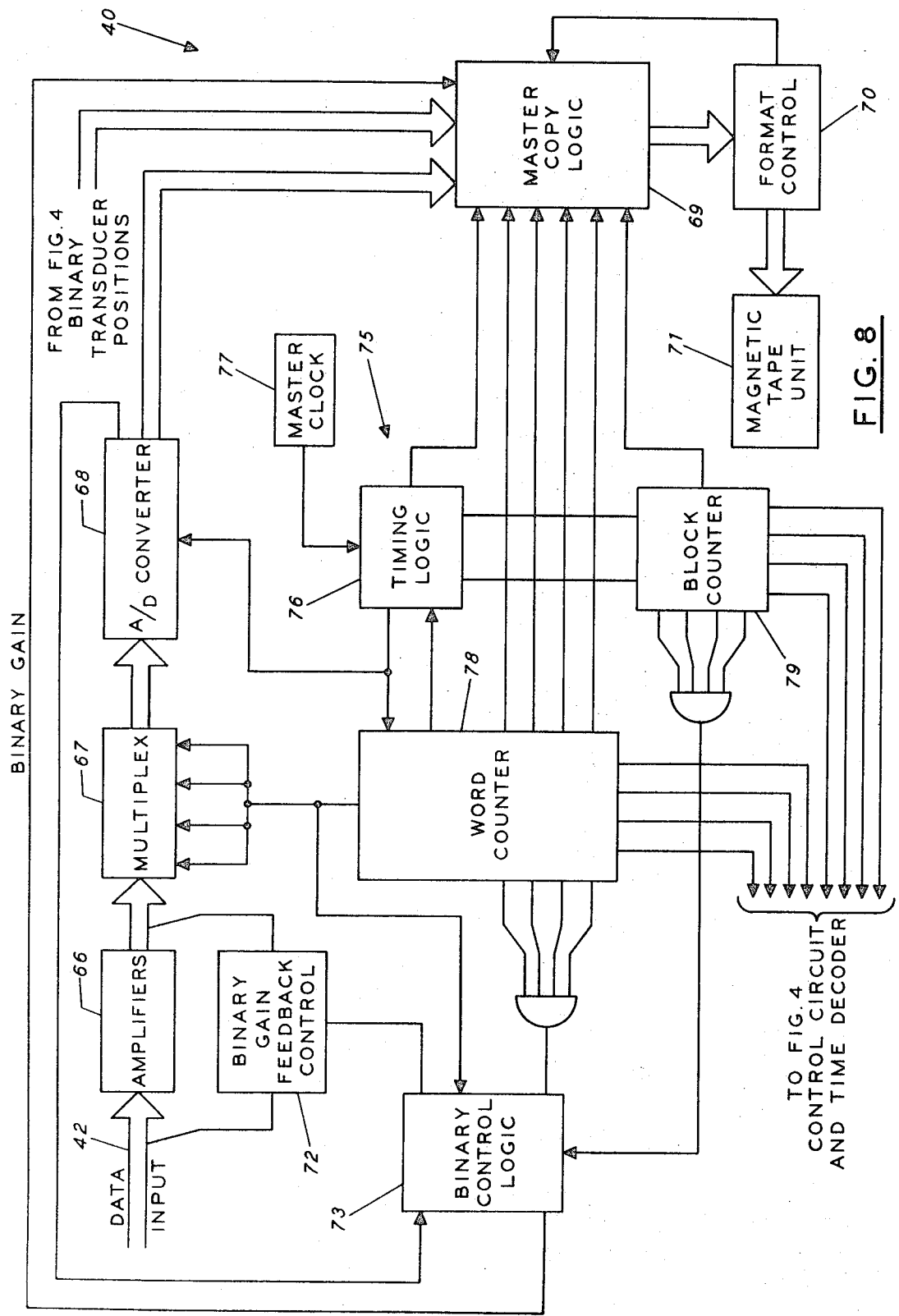
FIG. 8 illustrates, in functional block form, the digital seismic field system of FIG. 4 for controlling the collection method of FIGS. 1, 2 and 3.

As shown in FIG. 8, during collection of seismic data signals generated by the hydrophones pass from the streamer to digital field system 40 aboard the boat via conductor means 42, thence through amplifiers 66, multiplexer 67, analog-to-digital converter 68, master copy logic circuit 69, format control circuit 70 to magnetic tape unit 71 and onto magnetic tape. Binary gain shifts of amplifiers 66 are indicated by binary gain feedback control circuit 72 through binary logic circuit 73 connected between the feedback control circuit 72 and the master copy logic circuit 69.

To provide word lengths and block lengths of seismic data that are compatible with computer processing techniques, logic circuits 69 and 73 are carefully controlled for correct sequential operation utilizing a timing circuit generally indicated at 75. As indicated, timing circuit 75 includes a timing logic circuit 76 controlled by a master clock 77 and produces a series of timing (clock) pulses which are applied to logic circuits 69 and 73 through word counter 78 and block counter 79. The word and block counters 78 and 79 dictate, in conjunction with timing circuits 75, when the other groups of circuit elements must perform a preselected function. All operations are preferably performed in synchronism with the clock pulses (synchronous control). Each operation requires a certain number of clock pulses and, consequently, the timing to complete any one of the various operations is an exact multiple of the clock pulse. Thus, the readout of copy logic circuit 69 to magnetic tape unit 71 is accomplished at specific intervals of time that are exact multiples of the clock pulses. Further, the master copy logic circuit 69 can also be used to actuate other circuits, or other circuits can be used to terminate simultaneously with its actuation.

Header Information Encoding on Magnetic Tape at Magnetic Tape Unit 71

Initial binary gain settings are gated through master copy logic circuit 69, in correct time sequence, to permit digital recording onto the tape header section at magnetic tape unit 71. Timing logic circuit 75 in conjunction with word counter 78 and block counter 79 also provide enabling signals to a channel generally indicated at 65 of FIG. 4 which correctly enables control circuit 30 of FIG. 4. As a result, binary range position data -- a three-word, 14-bit binary code -- is passed through master logic circuit 69 and thence to magnetic tape unit 71 through format control circuit 70. Format control unit 70 may be provided with manual indexing circuitry in order to provide suitable binary information to the master copy logic circuit 69 during recording of header information. Although all header encoding activity is paced by signals from master timing logic circuit 75, during the header encoding activity, it is preferable that the amplifiers, multiplexer, and analog-to-digital converter remain in an inactive state. Usually master clock 77 is interrupted after header information has been placed onto magnetic tape at tape unit 71. Consequently, a gap is provided in the formatting of the tape record, in the manner previously discussed.

Seismic Data Encoding

After header information has been encoded, processing steps are carried out in sequence to record in digital form the seismic data onto magnetic tape. In more detail, at amplifier 66, the amplitude of the data is determined using binary gain feedback control circuit 72. The binary gain of feedback control 72 is then gated through binary control logic circuit 73 to master copy logic circuit 69, in correct time sequence to permit its digital recording in the same channel as the binary seismic data. At multiplexer 67, the amplitude of each analog signal is electrically sampled in sequence over a plurality of very small time intervals -- say, 0.002-second intervals. These signals, after being sampled, are transferred to analog-to-digital converter 68 where the digital results of the multiplexing operation are represented by a series of multibit binary code indications. The binary code information is electrically suited for storage on magnetic tape on the same channel as associated binary gain information. During all these steps, all activity is paced by regularly occurring clock signals from master clock 77. No event occurs within the entire system except at the occurrence of one of these clock signals or its multiple. In addition to block and word clock pulses, internal timing pulses are generated to cause transfer and manipulation of header and seismic data information such as at timing logic circuit 76 and master copy logic circuit 69. Thus, the output of copy logic circuit 69, for example, is accomplished at specific intervals of time which are exact multiples of the clock pulses produced by master clock 77. Other operations are caused to terminate simultaneously with the actuation of master copy logic circuit 69, while certain other circuits are being turned to a new state, signifying expiration of time for a preconceived, specified operation. As one subset of circuits is disabled, a new subset is enabled by timing pulses so as to perform new operational functions. The process (enabling some circuits disabling others, in sequence) is repeated over and over.

Format control unit 70 is capable of manual changes during the seismic data encoding activity. In that way the format of the seismic data can be varied to meet new application requirements.

Magnetic tape unit 71 may be one of several commercially available types and should have the capability of recording seismic data in binary form onto magnetic tape.

Although the system described in FIG. 8 controls multiplexing and conversion of analog seismic data to digital data as well as to provide data in correct time sequences, additional circuitry can be inserted and combined with the system hereinbefore described to provide additional data processing features, if desired.

The method of the present invention is preferably incorporated into digital seismic field systems and digital firing systems conventionally used in collecting marine data in digital form, such as provided by the Texas Instrument Company, Inc., Dallas, Texas. However, only portions of that system pertinent to the present invention have been discussed in detail; e.g., the portion of the system related to timing logic for incorporating binary code identification of marker range positions onto the magnetic tape has been discussed in detail above. Coordination of operations between the digital firing system and the digital seismic field system can, of course, be achieved in many ways, as, for example, shown in U.S. Pat. No. 3,416,631 for "Digital Remote Firing System," John D. Patterson.

In establishing the true position of the streamer relative to true geodetic coordinates, information derived from navigational circuit 45 of FIG. 5 is used in the following manner.

Navigational circuit 45 includes components for accurately measuring time travel of a radio signal from a transmitter to a receiver, and can be classified into one of five general groups: hyperbolic, ranging, azimuthal, composite and satellite systems, with a subgeneric classification of each being pulsed (time difference), CW (phase comparison) and combined (time difference and phase comparison). In general, they can be distinguished by the type of lattice (network of positional lines) generated by the transmitters as positional fixes occur. Source: H. W. Bigelow, "Electronic Surveying: Accuracy of Electronic Positioning Systems," Int. Hydrographic Bur. Radio Aids to Maritime Nav. & Hydrographic Operational Reports 6 (Sept. 1965), pp. 77–112.

Although only certain embodiments of the present invention have been illustrated and described, the invention is not meant to be limited to these embodiments, but rather to the scope of the following claims.

I claim:

1. A seismic data collecting method for determining the three-dimensional configuration of an earth formation underlying a body of water by means of a continuously moving marine seismic exploration system including a repetitive seismic source means and a plurality of hydrophones arranged in a marine streamer spread, comprising the steps of:
   a. moving, by single seismic boat means traversing a substantially straight base course line, said repetitive seismic source means and said streamer spread so that center points between all possible source-point hydrophone station pairs during movement of said seismic boat along said base course line form a two-dimensional grid of center points laterally offset to one side of said base course line including cross sets of center points aligned substantially perpendicular to said base course line, the total offset length of said two-dimensional grid of center points in said cross direction remaining substantially constant during the surveying operation, said movement being further characterized by allowing the trailing end of said streamer to trail behind said seismic boat offset relative to the base line and the leading end of the streamer to lead from a series of locations closer to said base line than said training end;
   b. firing said seismic source means in sequence at known times to initiate travel of said seismic energy downward toward seismic discontinuities within said earth formation;
   c. providing a multibit digital positional data indication of the position of at least two targets aboard said streamer relative to said seismic boat means; and
   d. receiving at said plurality of hydrophones after firing of said seismic source means, separate reflection signals representative of the energy received as the hydrophones are positioned at a plurality of known hydrophone stations so as to provide the series of multibit seismic data indications, said indications being associated with cross sets of information associated with cross sets of center points.

2. The method of claim 1 in which said multibit positional and seismic data indications are recorded onto seismic magnetic tape.

3. The method of claim 1 in which step (c) includes digitally measuring travel time of an electromagnetic wave between said targets and said seismic boat means.

4. The method of claim 3 in which step (c) is further characterized by the substeps of:
   i. generating an acoustic wave for travel from a known geodetic position relative to said boat means;
   ii. detecting at said targets said wave;
   iii. digitally determining the travel time of said wave between the known geodetic position and the targets.

5. The method of claim 4 in which substep (iii) includes:
   i. initiating counting by counting means as said acoustic wave is generated;
   ii. terminating counting when said wave is detected at said streamer targets;
   iii. storing said counts in a register;
   iv. generating a time-dependent enabling signal by means of word and block counters connected to said register so as to cause gating of said counts from said register;
   v. recording said counts as multibit positional digital data indications on a header section of a magnetic tape so as to identify the target positions as seismic data is received.

6. The method of claim 5 in which said magnetic tape has at least 21 tracks.

7. The method of claim 5 in which said magnetic tape has at least 9 tracks.

8. The method of claim 5 in which step (i) is further characterized by generating enabling signals from bistable multivibrator means and oscillator means at AND gate means so as to initiate said counting means; and step (ii) is further characterized by disenabling said bistable multivibrator means as said wave is received at the streamer targets thereby blocking the AND gate and terminating counting.

9. The method of claim 4 with the additional steps of:

i. processing said multibit positional digital indications to determine the range from said known geodetic position to said streamer targets; and
ii. transforming the three-dimensional coordinates of said known geodetic positions to establish three-dimensional coordinates of said streamer targets so as to enable mapping of said subsurface earth formation.

10. A seismic data collecting method for determining the three-dimensional configuration of an earth formation underlying a body of water by means of a continuously moving marine seismic exploration system including a repetitive seismic source means and a plurality of hydrophones arranged in a marine streamer spread, comprising the steps of:

a. moving, by a single seismic boat means traversing a substantially straight base course line, said repetitive seismic source means and said streamer spread so that center points between all possible source point-hydrophone station pairs during movement of said seismic boat along said base course line form a uniform two-dimensional grid of center points including cross sets of center points aligned substantially perpendicular to said base course line, the total offset length of said two-dimensional grid of center points in the cross direction remaining substantially constant during surveying operations, said movement being further characterized by allowing the trailing end of said streamer to trail behind said seismic boat at a substantially constant offset distance relative to but parallel with the base line, the leading edge of the streamer to lead from a series of locations closer to said base line than said trailing end; while central section means of said streamer to be arcuately disposed between said trailing and leading ends so that the streamer forms a modified catenary;
b. providing a multibit digital positional data indication of the position of at least two targets aboard said streamer relative to said seismic boat means;
c. firing said seismic source means in sequence at known times to initiate travel of said seismic energy downward toward seismic discontinuities within said earth formation; and
d. receiving at said plurality of hydrophones after firing of said seismic source means, separate reflection signals representative of the energy received as the hydrophones are positioned at a plurality of hydrophone stations so as to provide the series of multibit seismic data indications, said indications being associated with cross sets of information associated with cross sets of center points.

11. A method for indicating positions of a series of active hydrophones of a marine streamer towed by a marine seismic boat traversing a body of water overlying an earth formation under survey, consisting of the steps of:

a. providing several recording tracks and channels along a magnetic tape so as to define, at least on said magnetic tape, a header record section and a data record section;
b. providing at least a multibit digital data indication related to travel time of an electromagnetic wave between a geodetically known transducer means aboard said boat to a series of receiving targets on said streamer, said targets indicating the relative locations of said series of hydrophones during a seismic collection period;
c. combining the multibit digital data indications with control bits to provide a digital word; and
d. recording said digital word on several of said recording tracks along said magnetic tape at said header record section.

12. In the method of claim 11:

a. providing on said magnetic tape at least 21 tracks;
b. digitizing said travel time relative to at least two targets to provide for each digital word a 14-bit digital data indication related to said travel time, three bits blank, one bit for left-right control indication; and
c. combining the 14-, 3-, and 1-bit digital indications with three bits of control data to provide a 21-bit digital word for each of said targets.

13. In the method of claim 11:

a. providing on said magnetic tape at least nine tracks;
b. digitizing said travel time relative to at least two targets on said streamer to provide for each target a multibit digital data indication related to relative locations of said at least two targets;
c. combining said multibit digital indications with control bits to provide a plurality of bytes of information; and
d. recording said bytes as at least one digital word at said header section of said magnetic tape.

14. A method of producing binary identification codes for recordation on a header record section of a magnetic tape to identify streamer target positions during a period of collection of seismic data related to instantaneous positions of a series of hydrophones of said streamer (i) towed by a marine seismic boat means traversing a body of water overlying an earth formation under survey; and (ii) electrically connected to circuitry means aboard said marine boat means during said seismic collection period as a source of seismic energy is cyclically energized after coordinated advancement relative to a line of survey of said source and said series of hydrophones so as to provide, after several collection periods, multiple subsurface coverage of semi-identical subsurface areas of an earth formation underlying said series of hydrophones, consisting of the steps of:

a. prior to first initiation of one of (i) said source of seismic energy or (ii) said hydrophones, producing a multibit digital data indication related to travel time of an electromagnetic wave between a geodetically known transducer aboard said marine boat means to a series of target transducers aboard said streamer, said target transducers indicative of the instantaneous positions of said hydrophones;
b. storing the multibit digital data indication in a storage means;
c. generating a time-dependent signal by means of word and block counters connected to said storage means;

d. in response to the time-dependent signal, gating said stored digital data indication; and e. recording said multibit digital data indication as a series of digital words on said header record section of a magnetic tape so as to identify the target positions of said target transducers.

15. The method of claim 14 with the additional step of providing simultaneously with said multibit digital data indication related to said target positions an additional multibit data indication related to flanking position of said target position relative to a course line of traverse of said boat means.

16. The method of claim 15 with the additional steps of, after energization of said seismic source and collection of reflected seismic signals by said series of hydrophones and recordation, in digital form, of said signals on a data record section of said magnetic tape, moving said seismic source to a new source point location with respect to new instantaneous positions of said hydrophones whereby a substantial number of center points between respective hydrophone-source point pairs of previously positioned hydrophone-seismic source group and between the hydrophone-source point pairs of the present group are coincident, and thereafter repeating steps (a) through (e) of claim 14.

17. A seismic data collecting method for determining the three-dimensional configuration of an earth formation underlying a body of water by means of a continuously moving marine seismic exploration system including a repetitive seismic source means and a plurality of hydrophones arranged in a marine streamer spread, comprising the steps of:

a. moving, by single seismic boat means traversing a substantially straight base course line, said repetitive seismic source means and said streamer spread so that center points between all possible source point-hydrophone station pairs during movement of said seismic boat along said base course line form a two-dimensional grid of center points laterally offset to one side of said base course line including cross sets of center points aligned substantially perpendicular to said base course line;

b. firing said seismic source means in sequence at known times to initiate travel of said seismic energy downward toward seismic discontinuities within said earth formation;

c. providing a multibit digital positional data indication of the position of target means aboard said streamer relative to said seismic boat means; and d. receiving at said plurality of hydrophones after firing of said seismic source means, separate reflection signals representative of the energy received as the hydrophones are positioned at a plurality of known hydrophone stations so as to provide the series of multibit seismic data indications, said indications being associated with cross sets of information associated with cross sets of center points.

18. The method of claim 17 in which said multibit positional and seismic data indications are recorded onto seismic magnetic tape.

19. The method of claim 17 in which step (c) is further characterized by the substeps of:

i. generating an acoustic wave for travel from a known geodetic position relative to said boat means;

ii. detecting at said target means said wave;

iii. digitally determining the travel time of said wave between said known geodetic position and said boat means.

* * * * *